United States Patent [19]

Yamasaki et al.

[11] Patent Number: 5,319,624
[45] Date of Patent: Jun. 7, 1994

[54] ELECTROMAGNETIC ACTUATOR AND OPTICAL DISK APPARATUS INCORPORATING THE SAME

[75] Inventors: Hideo Yamasaki; Makoto Nagasato, both of Yokohama, Japan

[73] Assignee: Kabushiki Kaisha Toshiba, Kawasaki, Japan

[21] Appl. No.: 54,232

[22] Filed: Apr. 30, 1993

Related U.S. Application Data

[63] Continuation-in-part of Ser. No. 858,625, Mar. 27, 1992, abandoned, which is a continuation-in-part of Ser. No. 538,098, Jun. 13, 1990.

[30] Foreign Application Priority Data

| Jun. 13, 1989 | [JP] | Japan | 1-148451 |
| Dec. 27, 1989 | [JP] | Japan | 1-336660 |
| Feb. 27, 1990 | [JP] | Japan | 2-44403 |
| Mar. 29, 1991 | [JP] | Japan | 3-67050 |
| Sep. 30, 1991 | [JP] | Japan | 3-250622 |
| Jan. 30, 1992 | [JP] | Japan | 4-14415 |

[51] Int. Cl.⁵ ............................................. G11B 7/08
[52] U.S. Cl. .............................. 369/44.14; 369/44.15; 359/814; 359/824
[58] Field of Search ............. 369/44.14, 44.15, 44.16, 369/44.17, 44.21, 44.22, 44.18, 44.19; 359/813, 814, 823, 824; 310/15, 17, 21, 22, 24

[56] References Cited

U.S. PATENT DOCUMENTS

| 4,545,046 | 10/1985 | Jansen et al. | 369/44.15 |
| 4,911,534 | 3/1990 | Beyersbergen van Henegowen et al. | 369/44.16 |

FOREIGN PATENT DOCUMENTS

| 56-068261 | 6/1981 | Japan | 310/15 |
| 62-165741 | 7/1987 | Japan | 369/44.14 |
| 63-002119 | 1/1988 | Japan | 369/44.14 |

*Primary Examiner*—Andrew L. Sniezek
*Assistant Examiner*—P. W. Huber
*Attorney, Agent, or Firm*—Oblon, Spivak, McClelland, Maier & Neustadt

[57] ABSTRACT

In an electro-magnetic actuator, a pair of magnetic circuits are separately arranged in a tracking direction and a carriage is located between the magnetic circuits and is movably supported or guide rails extending along the tracking direction. On the carriage, a lens holder for holding an objective lens is movably suspended and focusing coils are fixed on side surfaces of the lens holder. A tracking coil is fixed in the carriage and is extended in the magnetic circuit. Focusing permanent magnets of the magnetic circuits are so extended along the tracking direction as to produce, focusing magnetic fluxes penetrating the focusing coil and leakage magnetic fluxes penetrating the tracking coil. A focus drive force is generated by an interaction between a current supplied to the focusing coil and the focusing magnetic fluxes and a biasing track drive force is generated by an interaction between a current supplied to the tracking coil and the leakage magnetic fluxes.

9 Claims, 14 Drawing Sheets

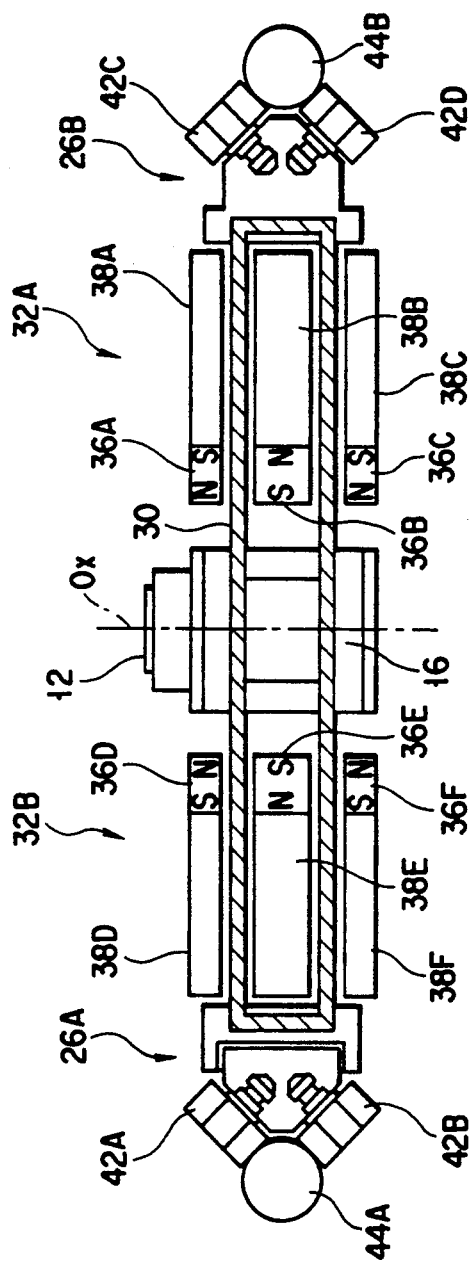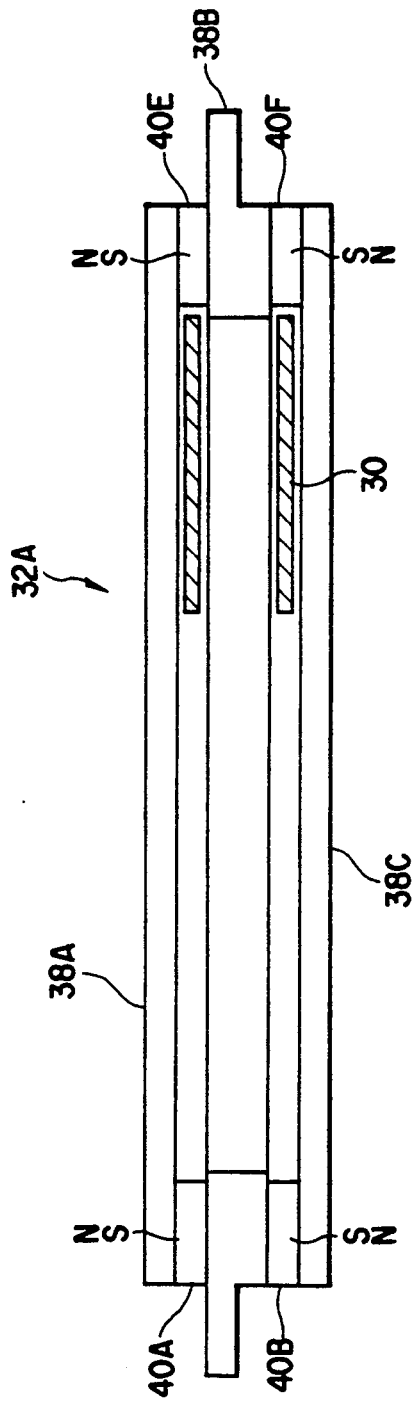
FIG. 16
FIG. 17

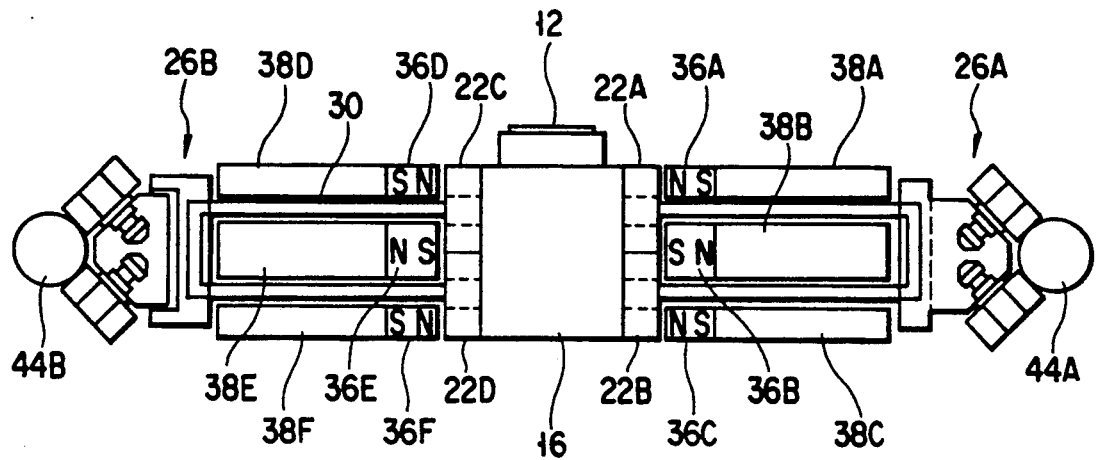
F I G. 18
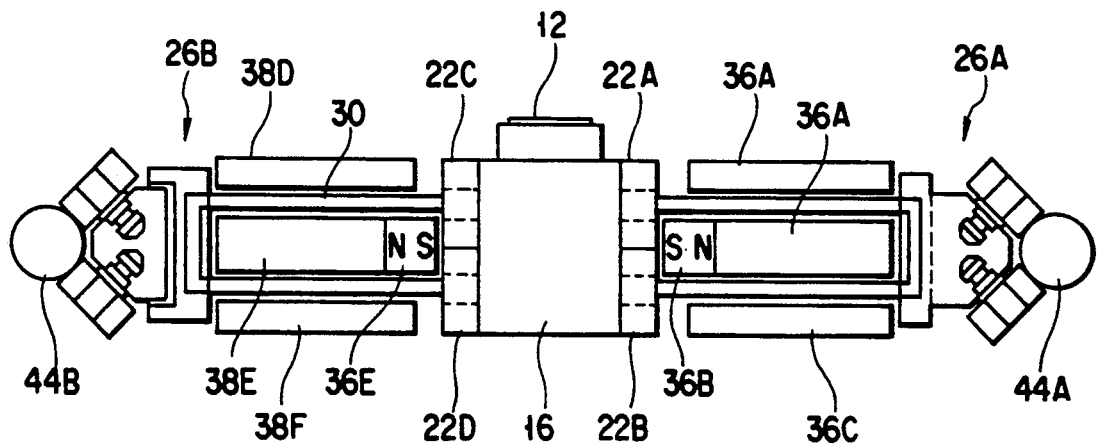
F I G. 19

ELECTROMAGNETIC ACTUATOR AND OPTICAL DISK APPARATUS INCORPORATING THE SAME

CROSS-REFERENCE TO THE RELATED APPLICATIONS

This application is a continuation-in-part application of U.S. patent application no. 858,625, filed Mar. 27, 1992, now abandoned, which is a continuation-in-part application of U.S. patent application ser. no. 538,098, filed Jun. 13, 1990, still pending.

BACKGROUND OF THE INVENTION

1. Field of the Invention

The present invention relates to an electromagnetic actuator and an optical disk apparatus incorporating the same and, more particularly, to a linear actuator for driving an optical head incorporated in an optical disk apparatus for reproducing/recording information from-/in an optical recording medium with a light beam.

2. Description of the Related Art

An conventional optical disk apparatus is provided with an optical system which includes a semiconductor laser for emitting a laser beam, a collimator lens for collimating the laser beam, a half mirror for splitting the collimated laser beam into two laser beams and an object lens for converging the laser beam on an optical recording medium such as an optical disk. The conventional optical disk apparatus is further provided with means for detecting a focusing state of the convergent laser beam on the optical disk to generate a focusing signal, means for detecting a tracking state of the convergent laser beam on the optical disk to generate a tracking signal, and means for retrieving an information recorded on a tracking guide formed on the optical disk to generate a retrieving signal. The objective lens is movably suspended and is moved in a focusing direction along an optical axis of the objective lens and in a tracking direction along a radial direction of the optical disk in response to the focusing and tracking signals. Thus, in the focusing and tracking states, the laser beam is focused on the optical disk and traces the tracking guide by the objective lens and information recorded on the optical disk is retrieved by the focused laser beam.

One of conventional optical disk apparatuses is disclosed in Laid Open Publication (Kokai) 1-192022, which is shown in FIGS. 1 and 2. In the optical disk apparatus shown in FIGS. 1 and 2, a lens holder 102 for supporting a objective lens 101 is suspended by leaf springs 103a, 103b which is substantially arranged in parallel and fixed on an optical block 105. A focusing coil 104 is wound around the objective lens 101 and is located in a magnetic field produced from focusing permanent magnet 110a, 110b so that the leaf spring is deformed and the objective lens 101 is moved in a focusing direction F, when the focusing coil 104 is energized The focusing permanent magnets 110a, 110b are so arranged that the magnets 110a, 110b are extended in a tracking direction T along a radial direction of an optical disk and the lens holder 102 is arranged between the focusing permanent magnets 110a, 110b.

The optical block 105 has inclined surfaces 105a, 105b at its upper and lower side and ball bearings 107a to 107h are fixed on the inclined surfaces 105a, 105b which are movably mounted on magnetic yokes 109a, 109b so that the optical block can be moved in the tracking direction along the longitudinal direction of the magnetic yokes 109a, 109b. Tracking coils 106a, 106b of a linear actuator are fixed to the optical block 105 and the magnetic yokes 109a, 109b are inserted into the tracking coils 106a, 106b, respectively so that lower sections of the tracking coils 106a, 106b are located in gaps between the magnetic yokes 109a, 109b and tracking permanent magnets 108a, 108b of the linear actuator. Thus, a tracking force is applied to the tracking coils 106a, 106b by an interaction between a current flowing through the tracking coils and a magnetic field produced from the tracking permanent magnets 108a, 108b so that the optical block 105 is moved in the tracking direction T, when the tracking coil 106a, 106b are energized.

In the conventional optical disk apparatus, a height of the apparatus along the focusing direction F can not be minimized, since the lens holder 102 for supporting the objective lens 101 and the leaf springs 103a, 103b are located above the optical block 105 and a space in which the objective lens is moved is required above the optical block 105. Further, the size of the apparatus along the focusing direction can not also be decreased, since the magnetic yokes 109a,109b are located above the tracking permanent magnet 108a, 108b. Thus, the conventional apparatus can not be designed in compact and a flat apparatus can not be realized.

SUMMARY OF THE INVENTION

An object of the invention is to provide an electromagnetic actuator for information recording and reproducing apparatus, in which sizes of an actuator and a magnetic circuit can be minimized with respect to a focusing direction so that the apparatus can be assembled into a compact in size.

An another object of the invention is to provide an electro-magnetic actuator for information recording and reproducing apparatus, in which utilization of tracking and focusing coils can be effectively improved so that focusing and tracking driving forces with respect to par unit current can be increased.

According to the invention, there is provided an electro-magnetic actuator for moving a first unit movable in a first direction and a second unit provided on the first unit and movable in a second direction perpendicular to the first direction, comprising:

a first magnetic yoke having first and second flat surfaces and a first side surface;

plurality of first permanent magnets for generating first magnetic fluxes, which are separately fixed on the first surface of the first yoke;

plurality of second permanent magnets for generating second magnetic fluxes, which are separately fixed on the second surface of the first yoke;

a second magnetic yoke having a second side surface and a flat surface faced to the first surface of the first yoke with a first magnetic gap between the first permanent magnets, and fixed on the first permanent magnets, the first magnetic fluxes being guided to the first magnetic gap through the first and second magnetic yokes;

a third magnetic yoke having a third side surface and a flat surface faced to the second surface of the first yoke with a second magnetic gap between the second permanent magnets, and fixed on the second permanent magnets, the second magnetic fluxes being guided to the second magnetic gap through the first and third magnetic yokes;

third, fourth and fifth permanent magnets generating third magnetic fluxes, which are fixed to the side surfaces of the first, second and third magnetic yokes;

first coil fixed to the first unit and extending in the first and second gaps, in which a first current is supplied; and second and third coils fixed to the second unit and faced to the third, fourth and fifth permanent magnets with a traveling space along the first direction, in which a second current is supplied, a first driving force causing the first unit to move in the first direction being generated due to an interaction between the first current and the first, second and third magnetic fluxes penetrating the first coil in the first and second gaps and the traveling space, and a second driving force causing the second unit to move in the second direction being generated due to an interaction between the second current and the third magnetic fluxes penetrating the second and third coils in the traveling space.

According to the invention, there is also provided apparatus for recording/reproducing information from-/in an optical disk with a light beam, comprising:

means for generating the light beam;

means for converging the light beam onto the optical disk;

means for movably suspending the converging means means for carrying the suspending means; and first and second magnetic circuits for generating first driving force for moving the carrying means in a first direction and second driving force for moving the suspending means in a second direction perpendicular to the first direction, the first and second magnetic circuit being separately arranged and the carrying means located between the first and second magnetic circuits;

each of the magnetic circuit including:

a first magnetic yoke having first and second flat surfaces and a first side surface;

plurality of first permanent magnets for generating first magnetic fluxes, which are separately fixed on the first surface of the first yoke;

plurality of second permanent magnets for generating second magnetic fluxes, which are separately fixed on the second surface of the first yoke;

a second magnetic yoke having a second side surface and a flat surface faced to the first surface of the first yoke with a first magnetic gap between the first permanent magnets, and fixed on the first permanent magnets, the first magnetic fluxes being guided to the first magnetic gap through the first and second magnetic yokes;

a third magnetic yoke having a third side surface and a flat surface faced to the second surface of the first yoke with a second magnetic gap between the second permanent magnets, and fixed on the second permanent magnets, the second magnetic fluxes being guided to the second magnetic gap through the first and third magnetic yokes;

third, fourth and fifth permanent magnets generating third magnetic fluxes, which are fixed to the side surfaces of the first, second and third magnetic yokes;

first coil fixed to the carrying means and extending in the first and second gaps, in which a first current is supplied; and second and third coils fixed to the suspending means and faced to the third, fourth and fifth permanent magnets with a traveling space along the first direction, in which a second current is supplied, a first driving force causing the first unit to move in the first direction being generated due to an interaction between the first current and the first, second and third magnetic fluxes penetrating the first coil in the first and second gaps and the traveling space, and a second driving force causing the second unit to move in the second direction being generated due to an interaction between the second current and the third magnetic fluxes penetrating the second and third coils in the traveling space.

Additional objects and advantages of the invention will be set fourth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 16 is a cross sectional view showing the electro-magnetic actuator shown in FIG. 15;

FIG. 17 is a side view showing the tracking magnetic circuit shown in FIG. 15;

FIG. 18 is a front view showing the electromagnetic actuator and the focusing magnetic circuit shown in FIG. 13;

FIG. 19 is a front view showing the another electro-magnetic actuator and the focusing magnetic circuit shown in FIG. 14;

DETAILED DESCRIPTION OF THE PREFERRED EMBODIMENTS

Figure 1:
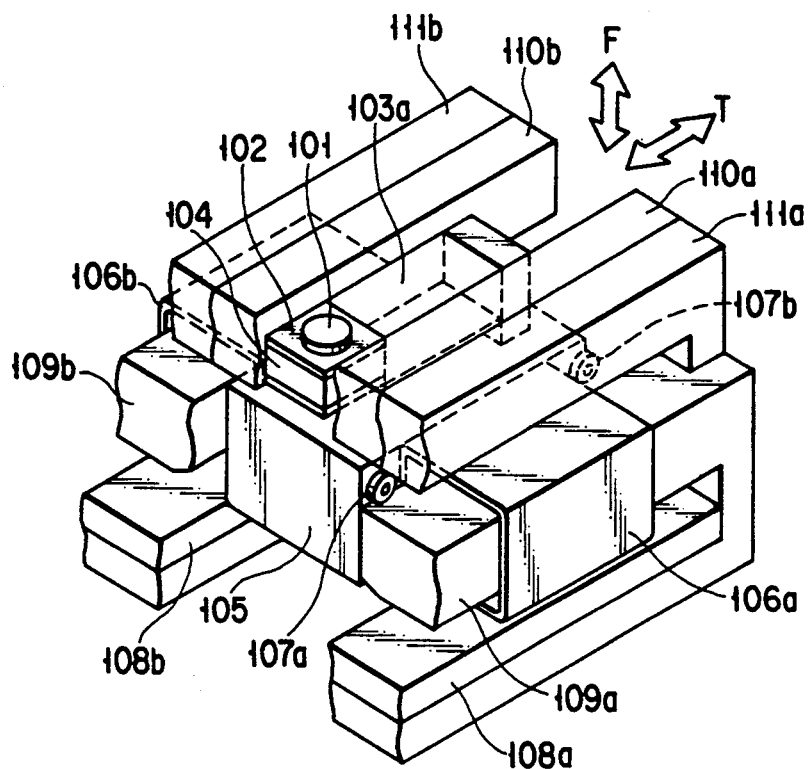
FIG. 1 is a perspective view schematically showing a conventional optical head apparatus.
Figure 2:
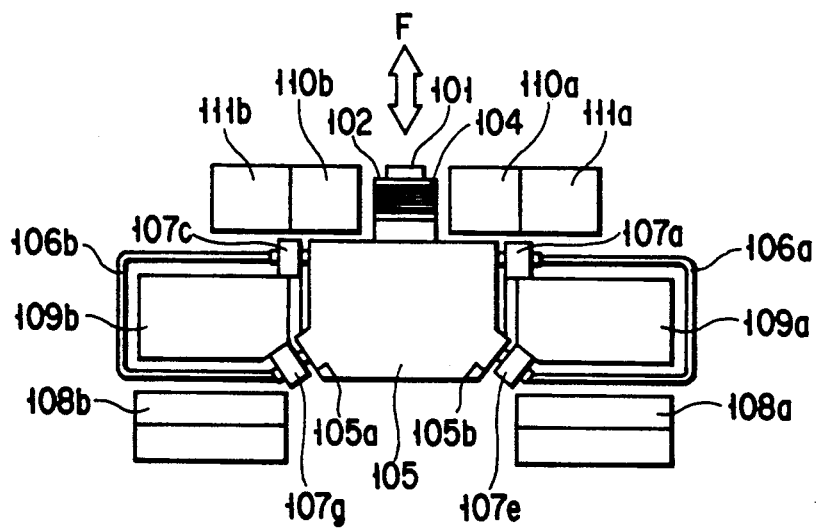
FIG. 2 is a cross sectional view showing the optical head apparatus shown in FIG. 1.
Figure 3:
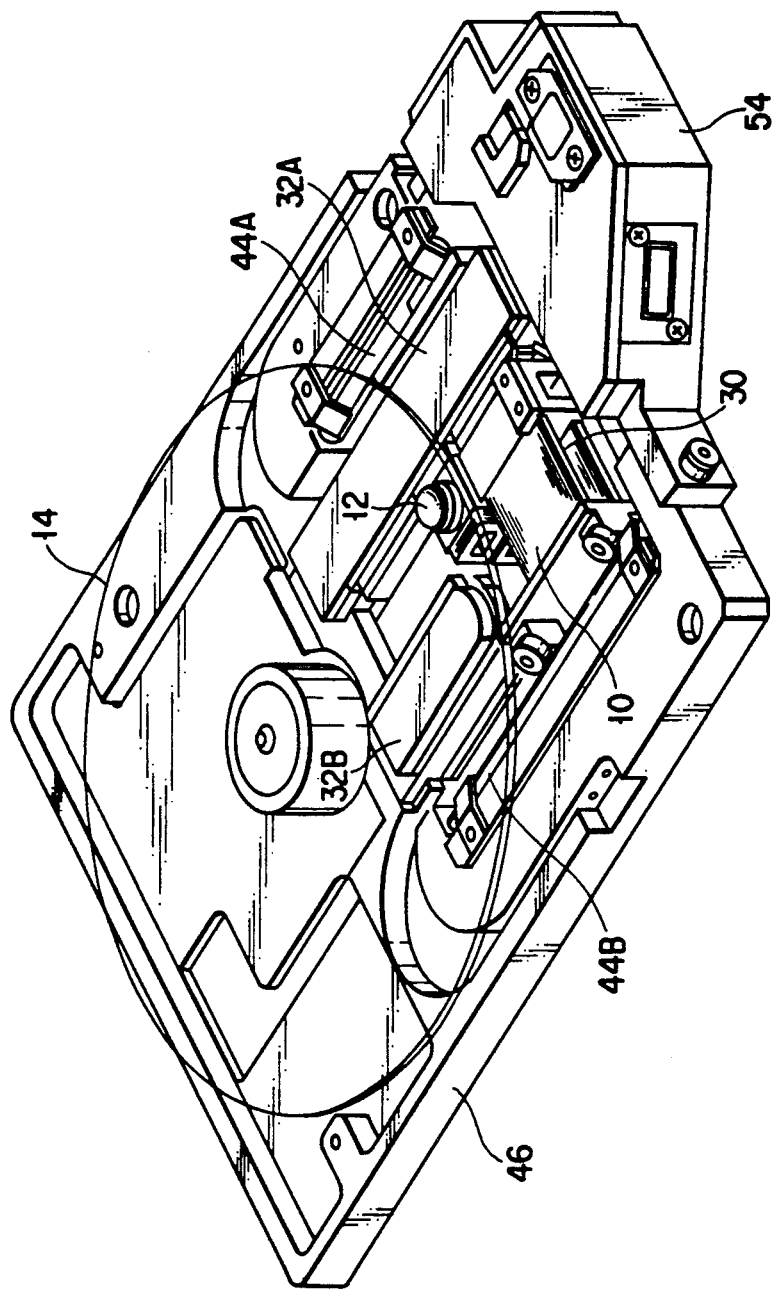
FIG. 3 is a perspective view showing an optical disk apparatus according to the invention.
Figure 4:
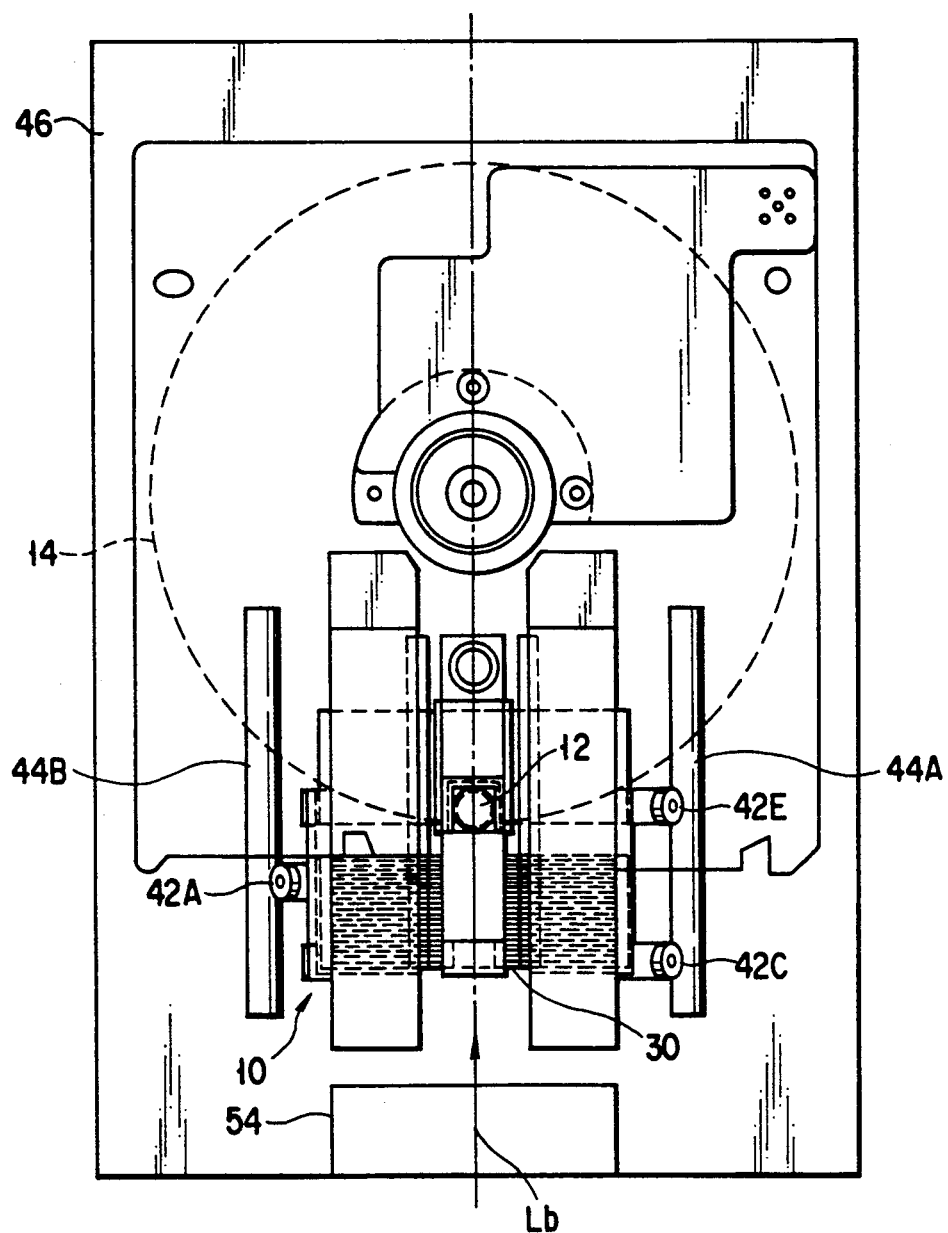
FIG. 4 is a plane view showing the optical disk apparatus shown in FIG. 3.
Figure 5:
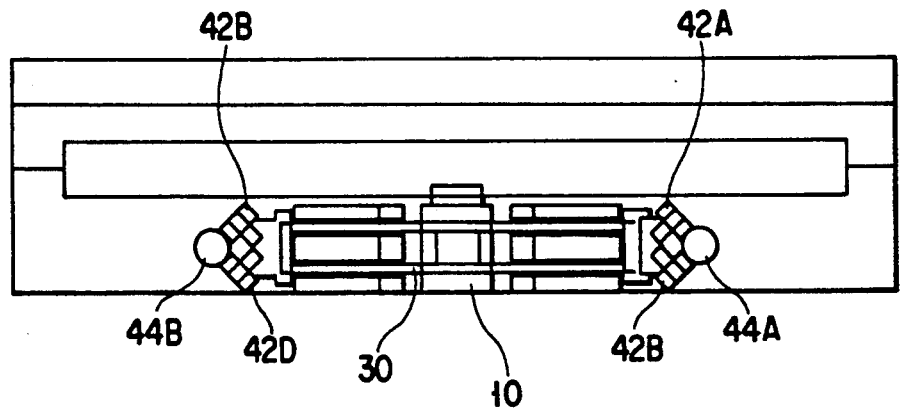
FIG. 5 is a schematic front view showing the optical disk apparatus shown in FIG. 3.

FIGS. 3, 4, and 5 show an optical disk apparatus according to one embodiment of the invention and FIGS. 6, 7, 8, 9 and 10 show a carriage 10 which is movably arranged in the optical disk apparatus shown in FIGS. 3, 4 and 5. An optical head, a focusing unit and a tracking unit of an electromagnetic actuator for an optical head is mounted on the carriage 10.

Figure 6:
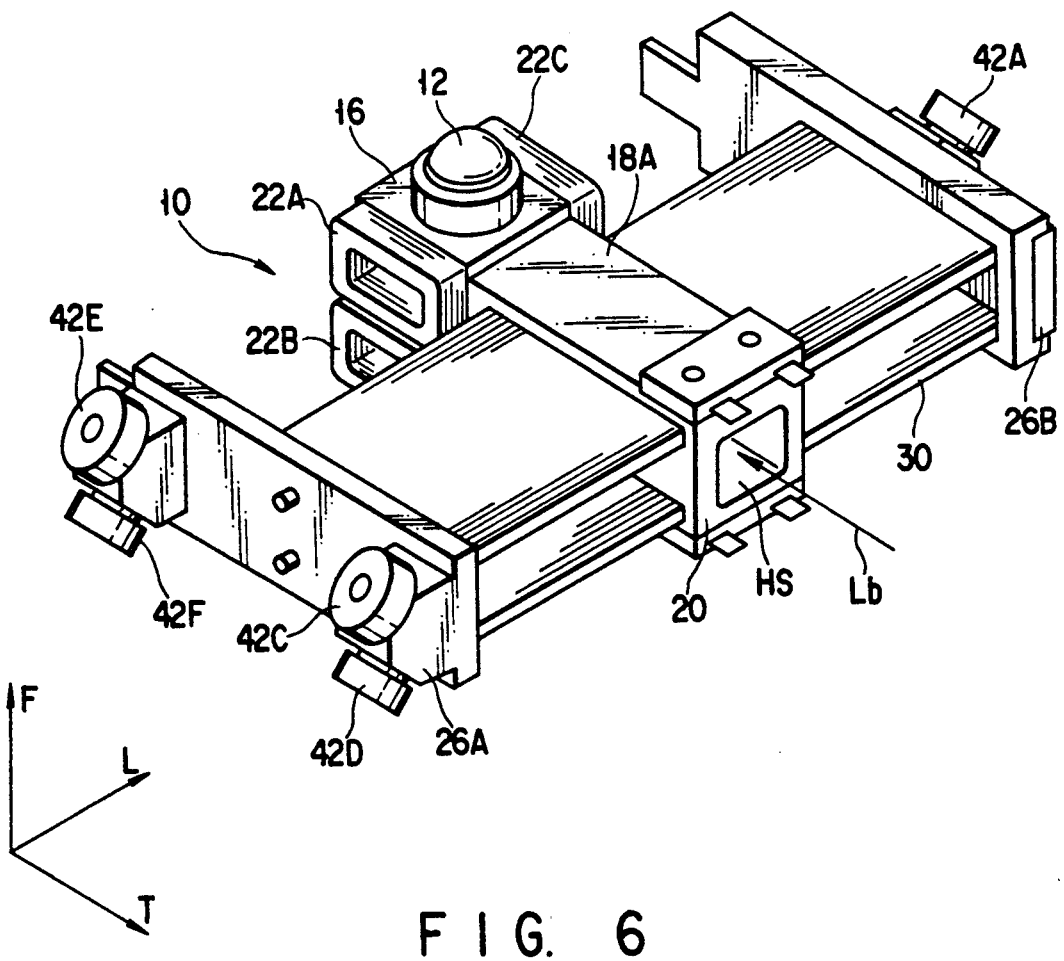
FIG. 6 is a perspective view showing a carriage mounted with a focusing unit and a tracking unit of an electro-magnetic actuator incorporated in the optical disk apparatus shown in FIG. 3.
Figure 7:
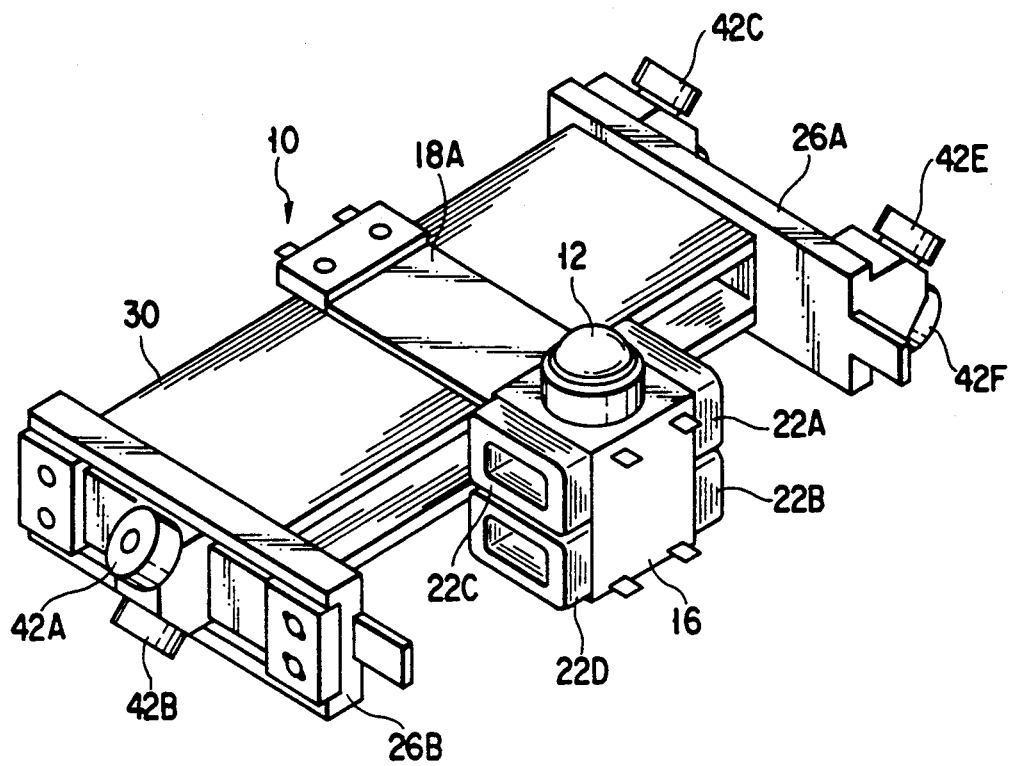
FIG. 7 is a perspective view showing the back of the carriage shown in FIG. 6.

As shown in FIGS. 6 and 7, an objective lens 12 for converging a laser beam Lb onto an optical disk 14 is held by means of a lens holder 16, and the lens holder 16 is fixed to one end of each of leaf springs 18A and 18B, which are arranged parallel to each other, so that the holder 16 can be moved in the direction of the optical axis of the objective lens 12, that is, in a focusing direction F. The respective other ends of the leaf springs 18A and 18B are fixedly mounted on a carriage body 20 which is located between the leaf springs 18A and 18B. As shown in FIGS. 6 and 7, two sets of focusing coils 22A, 22B, 22C and 22D for generating a driving force to drive the objective lens 12 in the focusing direction F are fixedly bonded to the lateral faces of the lens holder 16.

Figure 10:
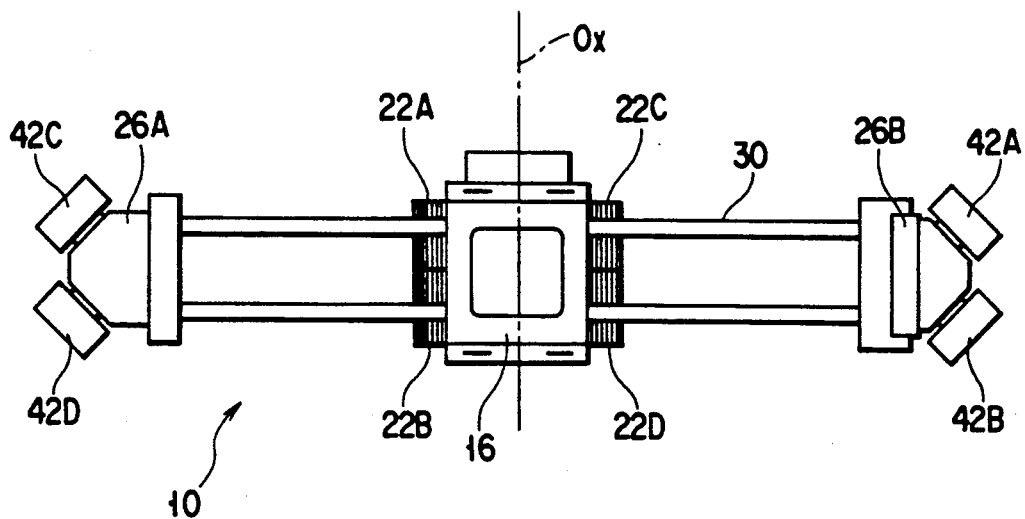
FIG. 10 is a rear view showing the carriage shown in FIG. 6.
Figure 11:
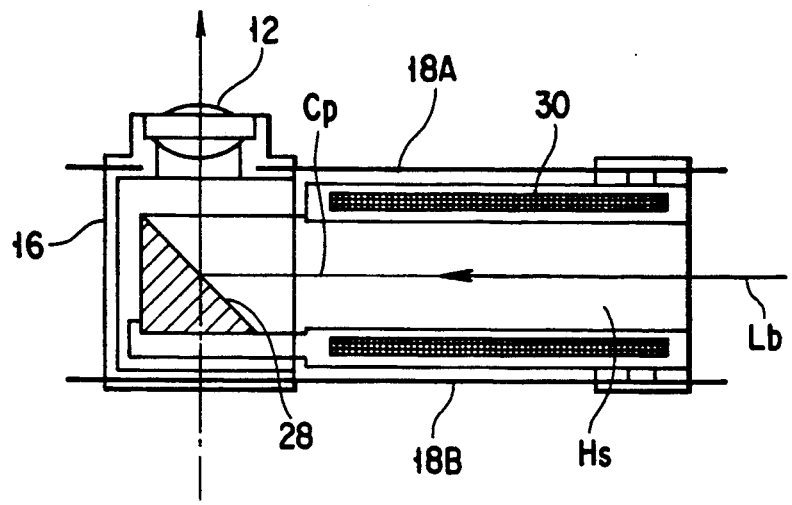
FIG. 11 is a cross sectional view showing the internal structure of the carriage shown in FIG. 6.
Figure 12:
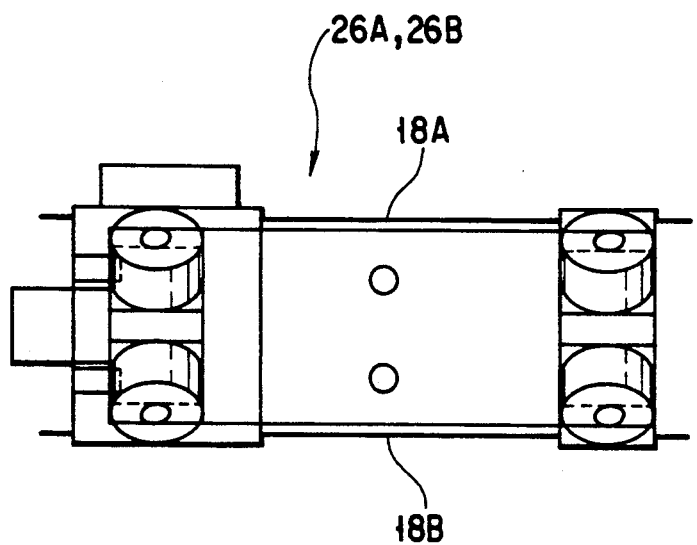
FIG. 12 is a side view showing the carriage shown in FIG. 6.

As shown in FIG. 11, the carriage body 20 has a hollow or waveguide space Hs therein through which the laser beam Lb is guided, and a reflecting mirror 28 for reflecting the laser beam Lb on the objective lens 12 is fixed in the lens holder 16 which communicates with the waveguide space Hs. A looped tracking coil 30 for generating a driving force to drive the carriage 10 in the radial direction of the optical disk 14, that is, in a tracking direction T, is fixedly buried in the carriage body 20. More specifically, as shown in FIGS. 6 to 10, two sets of flat plate portions of the tracking coil 30 oppositely extend substantially parallel to each other in a crosswise direction L perpendicular to the focusing and tracking directions F and T, and carriage supporting portions 26A and 26B shown in FIG. 12 are fixed individually to the opposite ends of the end portions of the tracking coil 30 are fixed individually in the carriage supporting portions 26A and 26B. The tracking coil 30 is in the form of a box obtained by combining the flat plate portions.

As shown in FIGS. 13 to 21, focusing coils 22A, 22B, 22C and 22D and the tracking coil 30 are so arranged the focusing coils 22A, 22B, 22C and 22D are faced to corresponding magnetic circuits 32A and 32B with magnetic gaps, respectively, and flat portions of the tracking coil 30 are located individually in the corresponding magnetic circuits 32A, 32B. The magnetic circuits 32A, 32B are elongated along the moving path of the carriage 10 in the radial direction of the optical disk 14, and includes a focusing magnetic circuit for generating a magnetic field which interacts with current flowing through the focusing coils 22A, 22B, 22C and 22D, and a tracking magnetic circuit for generating a magnetic field which interacts with current flowing through the tracking coil 30.

Figure 13:
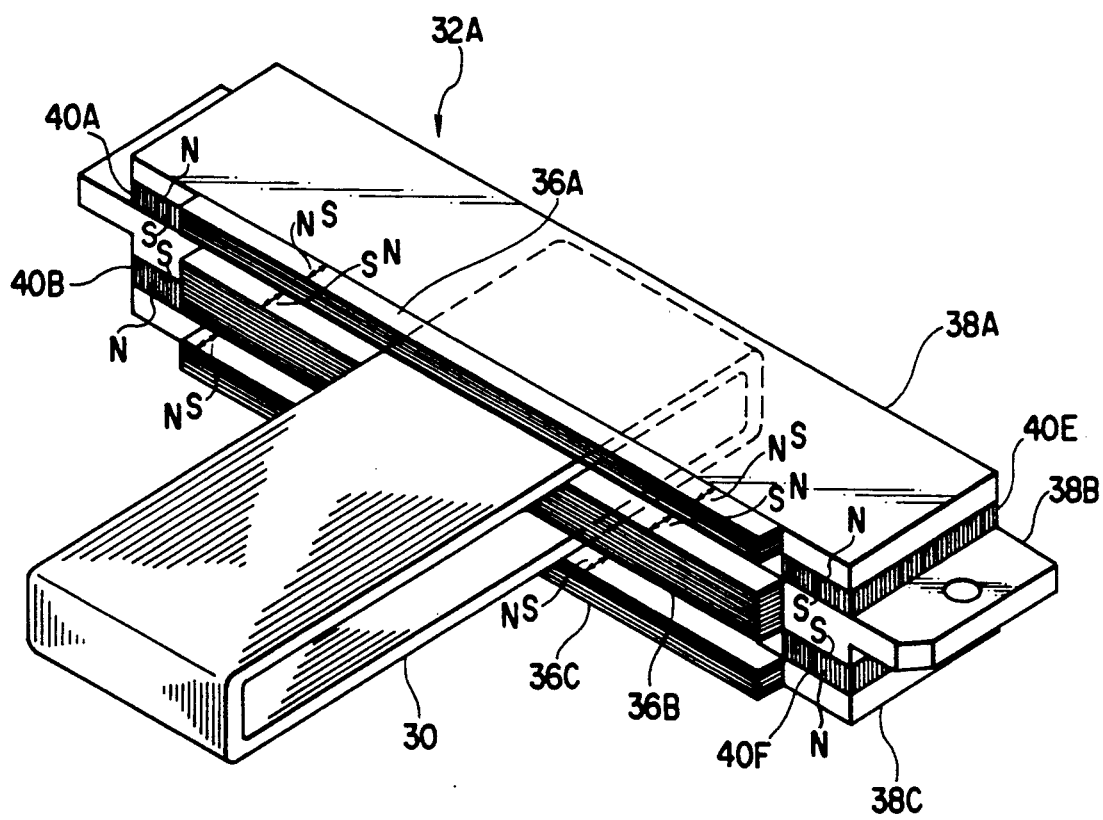
FIG. 13 is a perspective view showing a tracking magnetic circuit of the electro-magnetic actuator according to the one embodiment of the invention.
Figure 14:
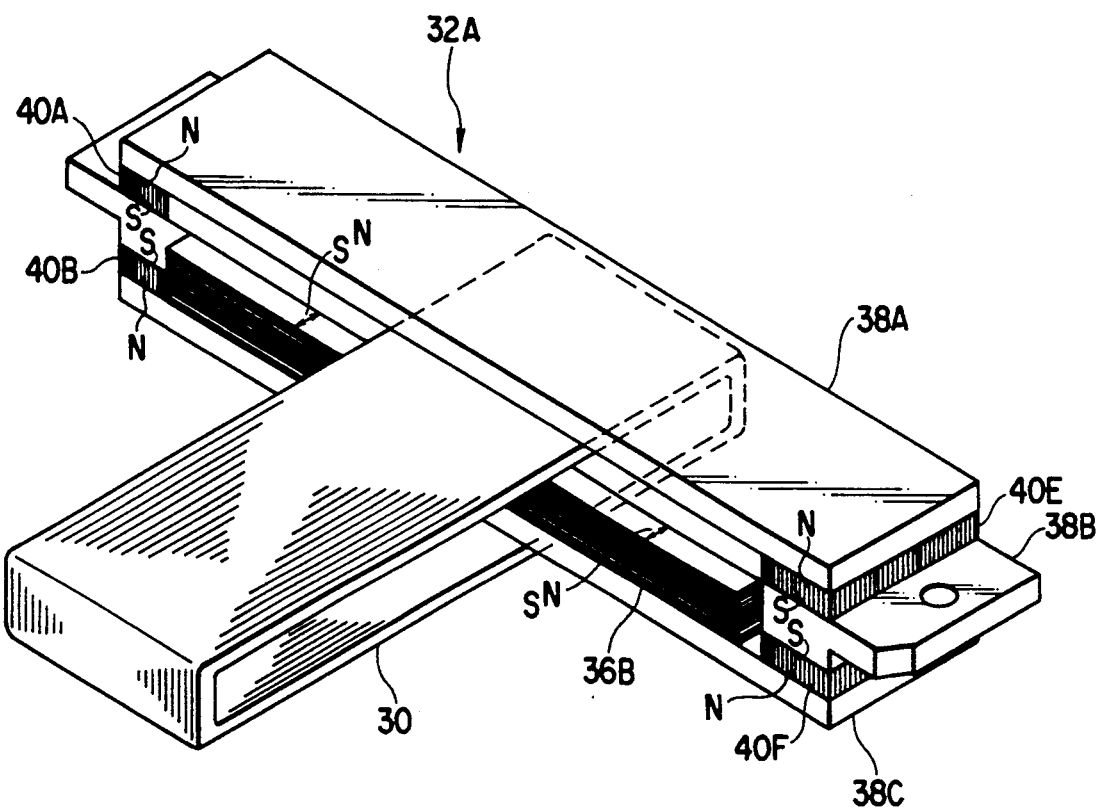
FIG. 14 is a perspective view showing an another tracking magnetic circuit of the electro-magnetic actuator according to the one embodiment of the invention.

In each of the magnetic circuit 32A, 32B, shown in FIG. 13, according to one embodiment of the invention, the focusing magnetic circuit is provided with three focusing magnets, i.e., center and side focusing magnets 36A, 36B, 36C or 36D, 36E, 36F. In each of the magnetic circuits 32A, 32B shown in FIG. 13, the center focusing magnet 36B or 36E is so arranged that one magnetic pole, i.e., south pole S of the center focusing magnet 36B or 36E is faced to the carriage 10 and the side focusing magnets 36A, 36C or 36D, 36F are so arranged that the another magnetic poles, i.e., north poles N of the side focusing magnet 36A, 36C or 36D, 36F are faced to the carriage 10. Thus, magnetic fluxes produced from the center focusing magnets 36B or 36E penetrates the focusing coils 22A, 22b or 22C, 22D and are guided to the side focusing magnets 36A, 36C or 36D, 36F. FIG. 14 shows a magnetic circuit 32A or 32B, according to the modified embodiment of the invention, in which the focusing magnetic circuit is provided with one focusing magnet 36B or 36E. In the magnetic circuit shown in FIG. 14, each of the focusing magnets 36B and 36E is faced to the corresponding pair of focusing coils 22A, 22B and 22C, 22D, respectively, as shown in FIG. 19.

In the focusing magnetic circuits, the focusing magnets 36A, 36B, 36C or 36D, 36E, 36f are arranged individually in parallel and extend in the tracking direction T. Further, each pair of the focusing magnets 36A, 36B, 36C and 36D, 36E, 36F are long enough to allow the focusing magnets 36A, 36B, 36C, 36D, 36E and 36F to face their corresponding focusing coils 22A, 22B, 22C and 22D even though the lens holder 16 is moved in the tracking direction. The magnetic gaps are so provided between the focusing coils 22A, 22B, 22C, 22D and the corresponding focusing magnets 36A, 36B, 36C, 36D, 36E, 36F as to ensure the movement of the carriage 10 and the lens holder 16, and the magnetic gap is minimized to improve the focusing force. When current is supplied to the focusing coils 22A, 22B, 22C and 22D, a focusing driving force is produced in the focusing coils 22A, 22B, 22C and 22D by interaction between the current flowing through the focusing coils 22A, 22B, 22C and 22D and magnetic fields generated by the focusing magnets 36A, 36B, 36C, 36D, 36E, 36F, shown in FIG. 21, and the lens holder 16 supported by the leaf springs 18A and 18B is moved along the focusing direction. As a result, the objective lens 12 is focused on the optical disk 14, so that a minimum-size beam spot is formed on the optical disk 14.

In the tracking magnetic circuit, center yokes 38B and 38E, with the focusing magnets 36B, 36E fixed thereon, extend together with the focusing magnets 36B, 36E in the tracking direction T. As shown in FIGS. 13, 14 and 17, plate-like tracking magnets 40A, 40B, 40C, 40D, 40E, 40F, 40G and 40H are bonded to the opposite ends of the center yokes 38B and 38E, and moreover, side yokes 38A, 38C, 38D and 38F facing the center yokes 38B and 38E are bonded to the tracking magnets 40A, 40B, 40C, 40D, 40E, 40F, 40G and 40H. Gaps for the passage of the tracking coil 30 are defined between the respective upper and lower surfaces of the center yokes 38B and 38E and their corresponding side yokes 38A, 38C, 38D and 38F, and these gaps have a sufficient length along the tracking direction T for the movement of tracking coil 30, along with the carriage 10, in the tracking direction T. Each of the center yokes 38B, 38E has cross sections having areas twice of that of the each side yoke 38A, 38C, 38D, 38F so that the magnetic resistance of the center yoke is substantially equal to that of the side yokes. Thus, the magnetic fluxes are effectively supplied to the magnetic gaps in the magnetic circuit 32A, 32B from the tracking permanent magnets 40A, 40B, 40C, 40D, 40E, 40F, 40G, 40H. When current is supplied to the tracking coil 30, in the tracking magnetic circuit, the current flowing through the tracking coil 30 interacts with magnetic fields generated by the tracking magnets 40A, 40B, 40C, 40D, 40E, 40F, 40G and 40H, whereby a driving force along the tracking direction is applied to the tracking coil 30. The tracking coil 30, as will be described later, is supported in a manner such that the carriage supporting portions 26A and 26B are movable in the tracking direction so that the carriage 10 is moved in the radial direction of the optical disk 14, and the laser beam Lb from the objective lens 12 is directed to a specific tracking guide (not shown) on the optical disk 14.

Figure 20:
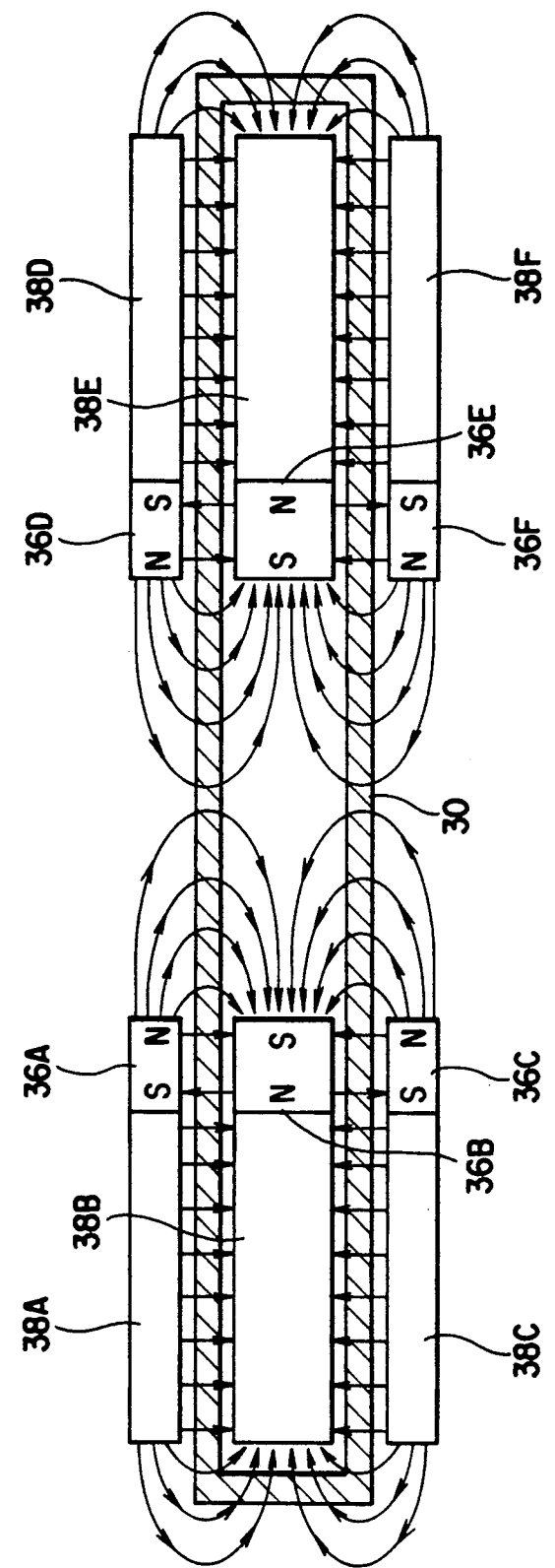
FIG. 20 is a cross sectional view showing the tracking magnetic circuit and a magnetic field produced in the tracking magnetic circuit shown in FIG. 15.
Figure 21:
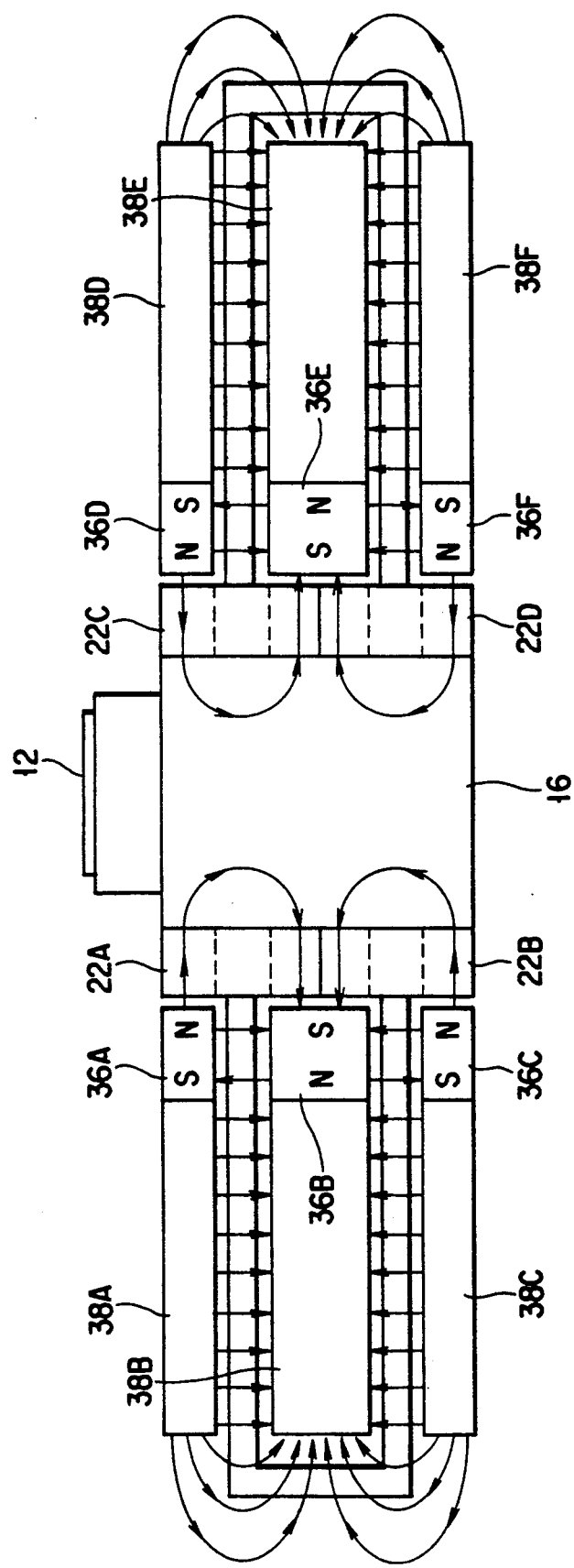
FIG. 21 is a front showing the focusing magnetic circuit and a magnetic field produced in the focusing magnetic circuit shown in FIG. 15.

In the tracking magnetic circuit having a polarity as shown in FIGS. 13, 14 and 18, the direction of the Lorentz force generated on a tracking coil 30 by the magnetic fields of plate-like focusing permanent magnets 40A, 40B, 40C, 40D, 40E, 40F, 40G, 40H coincides with that of the Lorentz force generated on the tracking coil 8 within a magnetic gap shown in FIG. 18. Furthermore, leakage fluxes shown in FIGS. 20 and 21 are generated, by magnetically saturating yokes 38A, 38B, 38C, 38D, 38E, 38F for constituting the tracking magnetic circuit, from those end portions of yokes 38A, 38B, 38C, 38D, 38E, 38F, to which the permanent magnets 40A, 40B, 40C, 40D, 40E, 40F, 40G, 40H are bonded such that the direction of the Lorentz force applied to the tracking coil 30 owing to the leakage fluxes coincides with that of the Lorentz force applied to the tracking coil 30 within the magnetic gap of the magnetic circuit 32A, 32B. Since, therefore, the Lorentz force in one direction can be applied to all the flat section of the tracking coil 30, the efficiency in use of the tracking coil 30 can be greatly increased, the tracking driving sensitivity (acceleration per unit current) can be improved, and the vibration characteristic in the tracking direction can be considerably improved.

As described above, the focusing permanent magnets 36A, 36B, 36C, 36D, 36E, 36F are bonded to their respective magnetic yokes 38A, 38B, 38C, 38D, 38E, 38F and the magnetic yokes 38A, 38B, 38C, 38D, 38E, 38F are so arranged that their longitudinal directions are substantially parallel to the tracking direction along which the carriage body 20 interposed between the magnetic yokes 38A, 38B, 38C, 38D, 38E, 38F is moved. Furthermore, the focusing permanent magnets 36A, 36B, 36C, 36D, 36E, 36F are arranged opposite to effective end faces of all focusing coils 22A, 22B, 22C, 22D for generating a focusing driving force, and the magnets 36A, 36B, 36C and 36D, 36E, 36F are symmetrical with regard to the entire seek region of the actuator. Consequently, in the focusing direction, a space of the electro-magnetic driving apparatus, can be reduced, and the whole optical disk apparatus can be decreased in size. Since, moreover, the efficiency in use of the focusing coils is greatly improved, the focusing driving force can be enhanced, and the focusing driving sensitivity (acceleration per current unit) can be improved. The focusing permanent magnets 36A, 36B, 36C, 36D, 36E, 36F and tracking permanent magnets 40A, 40B, 40C, 40D, 40E, 40F, 40G, 40H can be arranged so that their magnetic poles are opposite to those of the magnets shown in FIGS. 13 to 18. In the magnetic circuit shown in FIGS. 14 and 21, four focusing coils 22A to 22D for driving an objective lens 12 in the focusing direction are bonded to the lens holder 16, and the lens holder 16 is interposed between two of the focusing coils 22A, 22B and the other two of them which are arranged symmetrically with regard to the center axis of the lens holder 16.

FIGS. 13, 16 and 18 shows a relationship in arrangement of magnetic poles of the focusing permanent magnets, 36B, 36C, 36D, 36E, and 36F and the tracking permanent magnets 40A to 40H. The focusing permanent magnets 36A and 36B are bonded to their respective center magnetic yokes 38A and 38B. These center yokes are so arranged that their longitudinal directions are substantially parallel to the tracking direction and the lens holder 16 interposed between the center yokes. The focusing permanent magnets 36A, 36B, 36C, 36D, 36E, and 36F and tracking permanent magnets 40A to 40H can be arranged so that their magnetic poles are opposite to those of the magnets shown in FIGS. 14 and 21.

Figure 15:
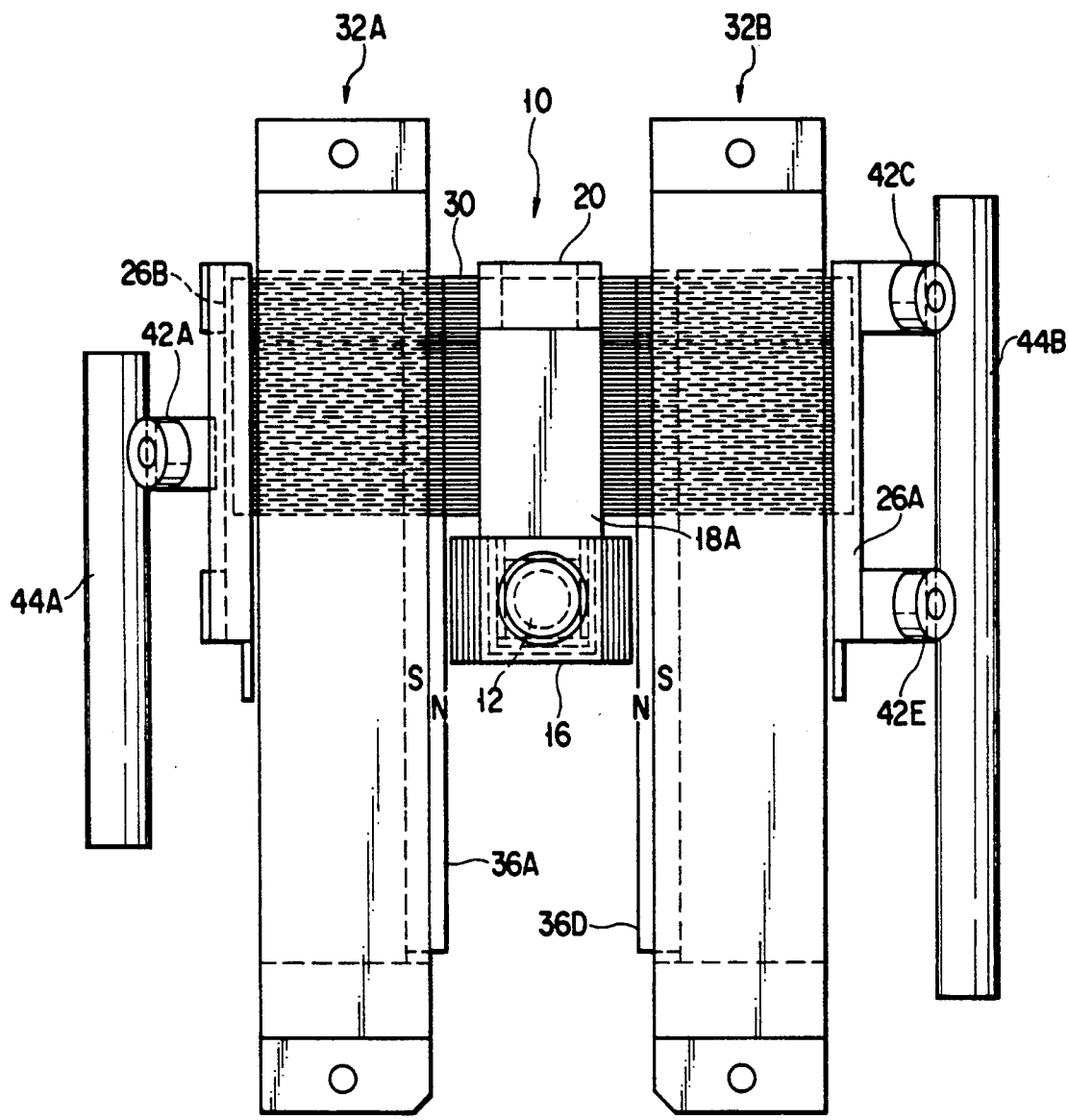
FIG. 15 is a plane view showing an electro-magnetic actuator according to the one embodiment of the invention.

As shown in FIGS. 15, 16 and 17, the carriage supporting portions 26A and 26B are provided with bearing units or guide rollers 42A, 42B, 42C, 42D, 42E, 42F respectively. The guide rollers 42A, 42B, 42C, 42D, 42E, 42F are arranged so as to be rollable on guide shafts 44A and 44B, which are fixed to a frame 46 as shown in FIGS. 3 and 4. Thus, when the driving force is applied to the tracking coil 30, the guide rollers 42A, 42B, 42C, 42D, 42E, 42F is rolled on the guide shafts 44A and 44B, respectively, so that the carriage 10 is moved along the tracking direction T.

Figure 8:
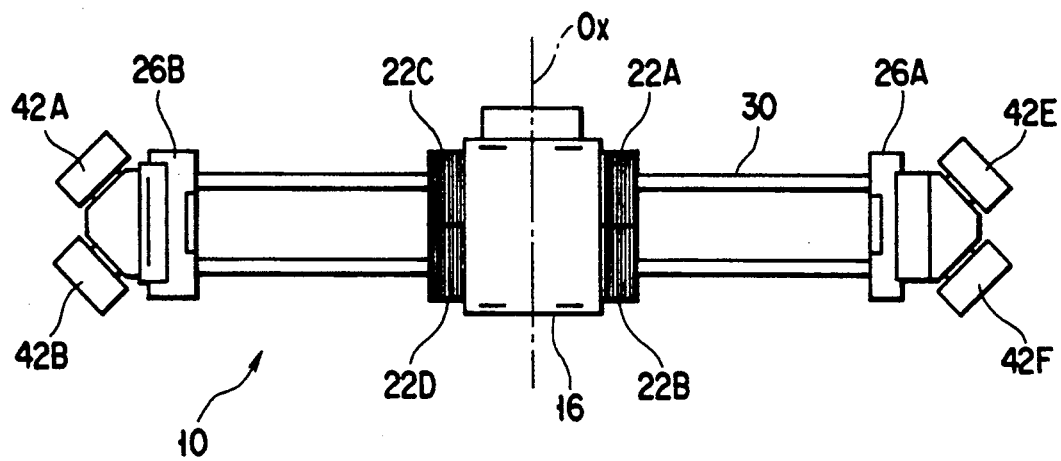
FIG. 8 is a front view showing the carriage shown in FIG. 6.
Figure 9:
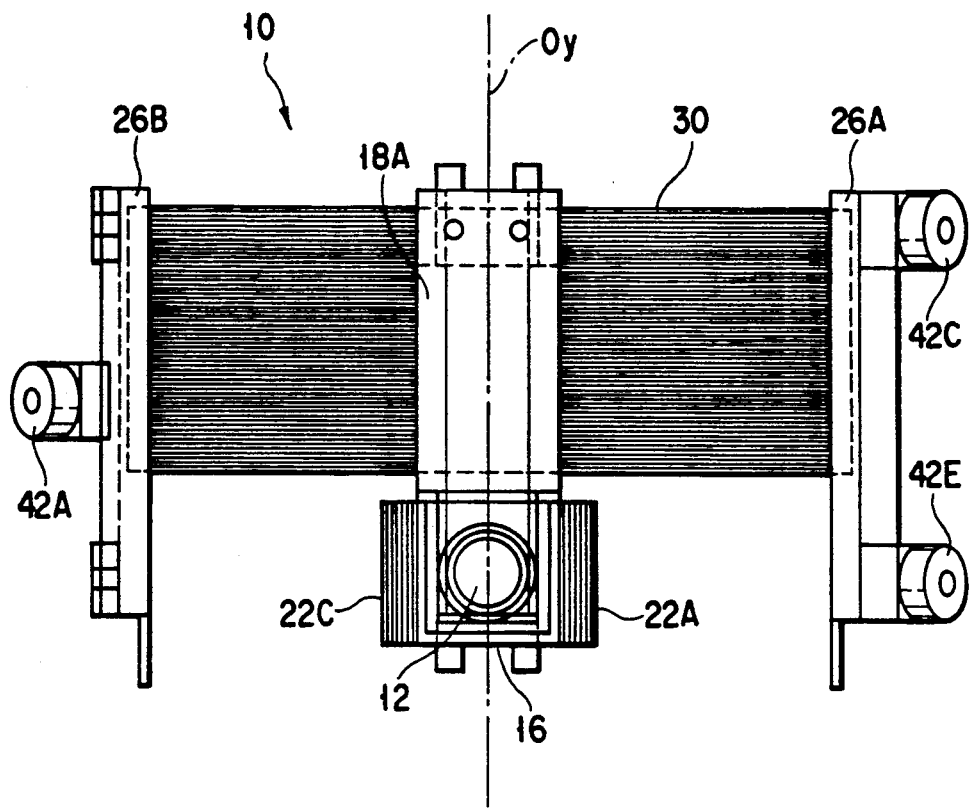
FIG. 9 is a plane view showing the carriage shown in FIG. 6.

The carriage 10 has a configuration substantially vertically symmetrical with respect a center line Ox, as shown in FIGS. 8 and 10, and horizontally symmetrical with respect to a center line Oy as shown in FIGS. 9 and 15. The center of gravity of the carriage 10, moreover, is located on a center line Cp of the space Hs for the passage of the laser beam, which extends along the tracking direction T. Likewise, the tracking coil 30 and the magnetic circuits 32A, 32B are arranged so as to be vertically symmetrical with respect to the center line Ox and horizontally symmetrical with respect to the center line Oy. Accordingly, the tracking-direction driving force, which is applied to the tracking coil 30 in the gaps of the magnetic circuits, acts on the carriage 10 uniformly with respect to the center line Cp of the space Hs, in the tracking direction. Thus, the center of gravity of the carriage 10 corresponds to the center of the point of application of the tracking driving force which acts on the tracking coil 30, and also corresponds to the center of movement defined by the two guide shafts 44A and 44B. In consequence, vibration characteristics are improved with respect to the tracking direction.

As already described with reference to FIGS. 6 and 7, the carriage body 20 is located between the pair of leaf springs 18A and 18B so that the whole carriage 10 is limited in height and has a flat form. With use of the tracking coil 30 having such a configuration, the carriage 10 can be made flatter, so that the optical head actuator can be reduced in thickness. Thus, in the optical head actuator shown in FIGS. 3, 4 and 5, the carriage body 20 must be provided with the space Hs which allows the passage of the laser beam Lb emitted from a stationary optical unit 54, which includes a semiconductor laser, collimator lens, and half-mirror. Accordingly, the flat plate portions of the tracking coil 30 fixed to the carriage body 20 must be designed so as to leave a space corresponding to the space Hs, at the least.

In the embodiment described above, the stationary optical unit 54 is separated from the carriage 10, and fixed to the frame 46. The laser beam Lb emitted from the stationary optical unit 54 advances along the center axis Cp shown in FIG. 11, and is introduced into the space Hs of the carriage body 20. This laser beam Lb is reflected by the reflecting mirror 28, which is attached to the lens holder 16, as shown in FIG. 11, to be incident upon the objective lens 12. The laser beam Lb reflected by the optical disk 1 is transmitted through the objective lens 12, reflected again by the reflecting mirror 28, and returned to the stationary optical unit 54. In the stationary optical unit 54, the laser beam Lb is detected by means of several sensors (not shown), and detection signals from the sensors are electrically processed to be converted into focusing signals and tracking signals. In response to these focusing and tracking signals, the currents supplied individually to the focusing coils 22A, 22B, 22C and 22D and the tracking coil 30 are determined, and the individual coils are driven.

In the embodiment described above, the four focusing coils 22A, 22B, 22C and 22D are fixed to the lateral faces of the lens holder 16. Alternatively, however, the two focusing coils 22A and 22C may be fixed individually to the lateral faces of the lens holder 16. In the case where the focusing coils 22A and 22C are fixed individually to the lateral faces of the lens holder 16, satisfactory magnetic fields may possibly cease to be applied from the focusing coils 22A and 22C to the magnetic circuits 32A, 32B as the lens holder 16 moves in the focusing direction F. Preferably, therefore, focusing magnets 36A, 36B, 36C, 36D, 36E, 36F are fixed to the lateral faces of the magnetic yokes 38A, 38B, 38C, 38D, 38E, 38F, respectively, and focusing magnets 36A, 36B, 36C, 36D, 36E, 36F are fixed to the lateral faces of the magnetic yokes 38A, 38B, 38C, 38D, 38E, 38F, respectively, as shown in FIGS. 13 and 18. According to this arrangement of the focusing magnets, satisfactory magnetic fields can be applied from the focusing magnets 36A, 36B, 36C, 36D, 36E, 36F to the focusing coils 22A, 22B, 22C, 22D so as to cover the range of movement of the focusing coils 22A, 22B, 22C, 22D.

It is to be understood that the present invention is not limited to the head actuator having the separate-type optical system in which the objective lens 12 and the semiconductor laser are separate from each other as aforesaid, and that the invention may be also applied to a head actuator in which the optical system is integrated in a manner such that most of the optical elements, including the semiconductor laser, objective lens 12, and sensors, are mounted on the carriage body 20. Thus, the stationary optical unit 54 may be removed from the frame 46. In this case, an optical component of the optical unit 54, including the semiconductor laser, collimator lens, half-mirror, and sensors of the stationary optical unit may be housed in the space Hs of the carriage body 20.

According to the present invention, as described above, the respective spaces of the carriage and the magnetic circuits with respect to the focusing direction can be narrowed, so that the whole electro-magnetic actuator for the optical head can be reduced in size. Further, the carriage is reduced in thickness with respect to the focusing direction and in weight, and the carriage and the magnetic circuits each have a symmetrical configuration with respect to both vertical and horizontal directions, so that the center of gravity of the carriage, the center of the tracking driving force obtained from the tracking coil and the magnetic circuits, and the respective centers of two guide shafts are in alignment with one another. Thus, highly satisfactory vibration characteristics can be obtained with respect to the tracking direction.

In the above-described tracking magnetic circuit of the present invention for supplying a magnetic flux to both the focusing coils and tracking coil, since the Lorentz force in one direction can be generated on all the circumference of the tracking coil, the efficiency in use of the tracking coil can be greatly increased, the tracking driving sensitivity (acceleration per unit current) can be improved, and the vibration characteristic in the tracking direction can be considerably improved. Furthermore, the focusing permanent magnets are arranged opposite to effective end faces of all focusing coils for generating a focusing driving force, and the focusing permanent magnets are symmetrical with regard to the entire seek region of the actuator. Consequently, a space for the electromagnetic driving apparatus in the focusing direction can be reduced, and the whole optical disk apparatus can be decreased in size. Since, moreover, the efficiency in use of the focusing coils is greatly improved, the focusing driving force can be enhanced, and the focusing driving sensitivity (acceleration per current unit) can be improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electro-magnetic actuator for moving a first unit movable in a first direction and a second unit provided on the first unit and movable in a second direction perpendicular to the first direction, comprising:

a first magnetic yoke having first and second flat surfaces and a first side surface;

plurality of first permanent magnets for generating first magnetic fluxes, which are separately fixed on the first flat surface of the first yoke;

plurality of second permanent magnets for generating second magnetic fluxes, which are separately fixed on the second flat surface of the first yoke;

a second magnetic yoke having a second side surface and a flat surface faced to the first flat surface of the first yoke with a first magnetic gap between the first permanent magnets, and fixed on the first permanent magnets, the first magnetic fluxes being guided to the first magnetic gap through the first and second magnetic yokes;

a third magnetic yoke having a third side surface and a flat surface faced to the second flat surface of the first yoke with a second magnetic gap between the second permanent magnets, and fixed on the second permanent magnets, the second magnetic fluxes being guided to the second magnetic gap through the first and third magnetic yokes;

third, fourth and fifth permanent magnets generating third magnetic fluxes, which are fixed to the side surfaces of the first, second and third magnetic yokes, respectively;

first coil fixed to the first unit and extending in the first and second gaps, in which a first current is supplied; and second and third coils fixed to the second unit and faced to the third, fourth and fifth permanent magnets with a traveling space along the first direction, in which a second current is supplied, a first driving force causing the first unit to move in the first direction being generated due to an interaction between the first current and the first, second and third magnetic fluxes penetrating the first coil in the first and second gaps and the traveling space, and a second driving force causing the second unit to move in the second direction being generated due to an interaction between the second current and the third magnetic fluxes penetrating the second and third coils in the traveling space.

2. The electro-magnetic actuator according to claim 1, wherein the first coil is formed into a closed-loop shape and has first and second flat sections opposed to each other and elongated along a third direction perpendicular to the first and second directions, and the first coil has first and second side sections opposed to each other and elongated along the second direction, the first and second flat sections being arranged in the first and second gaps respectively, and the first and second side sections being arranged outside of the first and second gaps.

3. The electro-magnetic actuator according to claim 2, wherein the first, second and third magnetic fluxes penetrate the first and second flat sections along the second direction.

4. The electro-magnetic actuator according to claim 1, wherein third, fourth and fifth permanent magnets have one and opposite magnetic polarity.

5. The electro-magnetic actuator according to claim 4, wherein the third, fourth and fifth permanent magnets are so arranged that the one polarity of the third magnet is faced to the second and third coils and the opposite polarities of the fourth and fifth permanent magnets are faced to the second and third coils.

6. An apparatus for recording/reproducing information upon an optical recording medium with a light beam, comprising:

means for generating the light beam;

means for converging the light beam onto the optical recording medium;

means for movably suspending the converging means;

means for carrying the suspending means; and first and second magnetic circuits for generating first driving force for moving the carrying means in a first direction and second driving force for moving the suspending means in a second direction perpendicular to the first direction, the first and second magnetic circuit being separately arranged and the carrying means located between the first and second magnetic circuits;

each of the magnetic circuit including:

a first magnetic yoke having first and second flat surfaces and a first side surface;

first permanent magnets for generating first magnetic fluxes, which are separately fixed on the first flat surface of the first yoke;

plurality of second permanent magnets for generating second magnetic fluxes, which are separately fixed on the second flat surface of the first yoke;

a second magnetic yoke having a second side surface and a flat surface faced to the first flat surface of the first yoke with a first magnetic gap between the first permanent magnets, and fixed on the first permanent magnets, the first magnetic fluxes being guided to the first magnetic gap through the first and second magnetic yokes;

a third magnetic yoke having a third side surface and a flat surface faced to the second flat surface of the first yoke with a second magnetic gap between the second permanent magnets, and fixed on the second permanent magnets, the second magnetic fluxes being guided to the second magnetic gap through the first and third magnetic yokes;

third, fourth and fifth permanent magnets generating third magnetic fluxes, which are fixed to the side surfaces of the first, second and third magnetic yokes, respectively;

first coil fixed to the carrying means and extending in the first and second gaps, in which a first current is supplied; and second and third coil fixed to the suspending means and faced to the third, fourth and fifth permanent magnets with a traveling space along the first direction, in which a second current is supplied, a first driving force causing the first unit to move in the first direction being generated due to an interaction between the first current and the first, second and third magnetic fluxes penetrating the first coil in the first and second gaps and the traveling space, and a second driving force causing the second unit to move in the second direction being generated due to an interaction between the second current and the third magnetic fluxes penetrating the second and third coils in the traveling space.

7. The apparatus according to claim 6, wherein the first coil is formed into a closed loop shape and having first and second flat sections opposed to each other and elongated along a third direction perpendicular to the first and second directions, and first and second side sections opposed to each other and elongated along the second direction, the first and second flat sections being arranged in the first and second gaps, respectively and the first and second side section being arranged outside of the first and second gaps.

8. The electro-magnetic actuator according to claim 7, wherein the first, second and third magnetic fluxes penetrate the first and second flat sections along the second direction.

9. The apparatus actuator according to claim 6, wherein the third, fourth and fifth permanent magnets have one and opposite magnetic polarity, and the third, fourth and fifth permanent magnets are so arranged that the one polarity of the third magnet is faced to the second and third coils and the opposite polarities of the fourth and fifth permanent magnets are faced to the second and third coils.

* * * * *